United States Patent [19]

Cantwell

[11] Patent Number: 4,577,249
[45] Date of Patent: Mar. 18, 1986

[54] DISC LOADING APPARATUS

[76] Inventor: Gill Cantwell, 2434 Purdue Ave., #17, Los Angeles, Calif. 90064

[21] Appl. No.: 462,286

[22] Filed: Jan. 31, 1983

[51] Int. Cl.[4] .......................... G11B 5/016; G11B 5/55
[52] U.S. Cl. ........................................ 360/99; 360/105
[58] Field of Search ............................ 360/105, 97–99

[56] References Cited

U.S. PATENT DOCUMENTS

| 4,193,102 | 3/1980 | Beuch | 360/105 |
| 4,218,714 | 8/1980 | Isozaki | 360/105 |
| 4,328,521 | 5/1982 | Pexton | 360/105 |
| 4,360,844 | 11/1982 | Maiers | 360/99 |
| 4,380,782 | 4/1983 | Hirose | 360/99 |

Primary Examiner—A. J. Heinz
Attorney, Agent, or Firm—Nilsson, Robbins, Dalgarn, Berliner, Carson & Wurst

[57] ABSTRACT

A floppy disc drive mechanism in which a lifter plate member operable by a handle manipulated by an operator replaces the floppy disc rotating mechanism into contact with the floppy disc. An interlock mechanism precludes engagement of the rotating guide mechanism or placement of the read/write heads into operating position unless a floppy disc is positioned in place within the drive mechanism.

28 Claims, 7 Drawing Figures

DISC LOADING APPARATUS

FIELD OF THE INVENTION

This invention relates to apparatus for loading and unloading flexible rotating magnetic media (floppy discs) into rotating magnetic memory drives, and more particularly for the positioning of the discs, verification of proper position, locking in place of the discs, and application to the discs of spindle elements, magnetic transducers, and standing wave eliminators.

DESCRIPTION OF PRIOR ART

Rotating magnetic memories of the floppy disc type, utilize a flexible disc of biaxially oriented polyethylene terephthalate coated with magnetic material, and permanently packaged in a stiff protective cover jacket with holes and slots in the jacket to provide limited access to the flexible disc.

Magnetic memory drives designed for use with these discs have provided an access slot in the housing slightly larger in all three dimensions, than the cover jacket. In use, the jacket is inserted loosely in this slot, and then a handle is manually operated to secure the disc and initiate the read/write sequences.

In one common design this handle is pivotably attached to one end of a lever, whose opposite end is attached to the fixed portion of the drive by pivots or flexures. Operation of the handle forces this lever down toward the disc and ultimately locks the lever into a fully depressed position. Approximately midway on the length of this lever, a spindle mechanism is rotatably mounted to the lever, and is forced to enter and engage the flexible disc by virtue of the downward movement of the lever. Due to the limited overall length of the drive, the lever length cannot be infinite, and therefore the amount of movement at the spindle position is no more than about a maximum of two-thirds of the movement generated by the actuating handle. This limited available movement forces undesirable compromises into the design of the spindle mechanism.

In this prior art, the front end of this lever is equipped with two claws, with angled portions which engage the edge of the disc jacket if the jacket is not quite fully inserted and thus forces the jacket into full insertion into the slot as the lever descends. If the jacket is not fully inserted beyond the capabilities of these angled surfaces to correct, then the sharp edges of the ends of the claws engage the surface of the disc jacket, and prevent the lever from descending further. It is a problem with this design, that the lever forces these sharp edges into the disc jacket with destructive results if more than a light force is applied to the handle by the operator.

Another example of prior art uses a camshaft with axis parallel to the direction of insertion of the data disc, and operable through a range of ninety degrees by rotating a large knob on the front panel. This camshaft is equipped with a series of cams and lever arms to actuate various elements within the drive.

Another design incorporates a loosely fitting receiver into which the disc jacket is inserted. After insertion, manual depression of a handle swings the entire receiver downward on a pivot, forcing the data disc to engage with a fixed, upwardly projecting spindle. A female hub assembly mounted on the receiver assembly completes the clamping action against the spindle. When the disc jacket is inserted, the leading edge engages an upturned tang on a spring loaded interlock plate sliding the plate ahead of the disc jacket and stretching a small extension spring. When the disc jacket is fully inserted, the interlock plate locks into its fully retracted position by engaging a pin on the receiver handle. Until the interlock plate is fully retracted, it prevents the closure of the receiver by interacting with a projection on the fixed portion of the drive. When the receiver is fully depressed and then slightly raised, a rotating latch apparatus locks it into that position. A subsequent small downward movement releases the rotating latch apparatus, and the receiver then returns to its fully raised position, driven to that position by a heavy compression spring. Once the receiver is in the fully raised position, an upward touch on the receiver handle disengages the pin from the interlock plate, and the extension spring suddenly snaps the interlock plate to its full forward position, ejecting the disc jacket an inch or so from the front panel of the drive, allowing easy gripping of the exposed jacket for removal. While that is the intended order of operation, it is also quite possible to simply remove the disc jacket from the drive with the finger tips as is done with other designs. When this is done, the interlock plate remains in its rearward position, and the receiver which could not otherwise be lowered without a disc in place, can now be freely closed with or without a disc. In some of these drives, lowering the receiver loads a pair of highly polished transducers against the data disc, and if the data disc is not present, then the transducers may be damaged as explained in more detail below. This design also includes an electrical switch to indicate that the receiver has been lowered, and under ordinary circumstances, activation of that switch would indicate to the electronic logic that a disc is loaded and that the drive is ready for data transfer operations, but because the receiver may be empty, no sure indication of readiness can be obtained until the spindle is rotated and an index signal is generated.

Early drives utilized a single magnetic transducer, embedded in a plastic button with a smooth spherical surface of both button and transducer which engaged the flexible plastic data disc by causing a small, localized, elastic deformation of the disc. This deformation was generated by a small, elastic felt, pressure pad applied to the data disc directly opposite the magnetic transducer.

In early drives, it was the practice to bias this felt pad toward the magnetic transducer by means of a metallic spring, and then to lift it away from the transducer by a still stronger spring attached to an electromagnetic actuator. When data transfer operations were not being conducted, the spindle could rotate with very negligible wear occurring to the disc and the transducer since the felt pressure pad was held away from the data disc. When data transfer operations were to commence, current was turned on to the electromagnetic actuator which moved to an actuated position, and removed the strong spring from acting on the pressure pad support, and therefore the light spring dropped the felt pad against the data disc with high velocity. Because the felt was elastic, the impact was absorbed without destructive results to the disc or transducer.

When the disc was rotating, and the felt pad was loaded against the data disc, the friction generated by the disc against the felt pad and against the transducer retarded rotation of the disc at the point of contact and standing waves were generated in the flexible disc. As a result, the effective radius of a previously written data track was slightly less than the true radius when the disc was fully flattened, or if a new data track was written, it was written at a radius which was slightly greater than nominal after the disc was fully flattened.

To avoid these dimensional errors due to standing waves, a foam pad of polyurethane was applied to the upper surface of the disc jacket in a rectangular area, and was opposed on the bottom side of the disc jacket with a flat surface. This polyurethane pad caused the semi-flexible walls of the protective jacket to collapse against the disc, and forced the flexible disc into a straight line just prior to entering the transducer to felt pad interface. By forcing the disc into this straight line, the standing waves that would otherwise form were ironed out. Because of the wear that was caused by rotating the disc against the disc jacket with this pressure applied, it was common practice to mount this polyurethane pad on the electromagnetic actuator, and thus when the actuator was not energized, both the felt pad, and the polyurethane pad were removed from contact with the data disc and its jacket.

Newer drives have incorporated two magnetic transducers, positioned on opposite sides of the data disc to read and write data on both surfaces. These transducers are positioned closely together, and are separated only enough to prevent excessive magnetic interaction. Unlike prior spherical transducers, these transducers are lapped to extreme flatness.

The first of these double-sided drives utilized the same electromagnetic actuator as the earlier single-sided drives. Unlike the earlier drives where the felt pad cushioned the impact, these new double-sided drives damaged the data disc by the collisions of the hard transducers when the actuator was energized.

One improvement was the addition of a pneumatic damper to control the rate of movement of the electromagnetic actuator.

A later improvement was to eliminate the electromagnetic actuator altogether, and to provide for lowering the upper transducer and the polyurethane pad against the disc and disc jacket at the same time and by the same device as that used to engage the spindle mechanism. In these designs, wear on the transducers and disc can only be minimized by stopping the spindle drive motor when data transfer operations are not taking place.

It is the practice in these double-sided designs, to mount one or both of the flat transducers by means of a thin, flexible, gimbal diaphragm. It is necessary to provide warnings with these drives, not to move the handle to the closed position without first inserting a data disc. If the drive is accidentally closed without a data disc in place, the extremely flat, lapped surfaces of the transducers come into direct contact with each other, and as is to be expected with such super flat surfaces, they stick together with great tenacity. Subsequent attempts to separate the transducers by opening the operating handle can damage the fragile gimbal diaphragms necessitating replacement or expensive repairs.

In the original single-sided drives, the transducer button was molded into generous slopes and curves beyond the spherical portion which engaged the data disc itself. These additional slopes and curves were intended to permit the protective disc jacket to slide freely over the button during loading and unloading operations, and to avoid any sharp edges which could snag and distort the edges of the cutout slots in the data disc jackets.

Fabrication techniques for the flat type of double-sided transducer necessarily result in sharp and semi-sharp edges which can snag the edges of the data disc jacket during loading and unloading. One attempt to minimize this problem, is to provide beveled projections near the transducer to attempt to deflect the disc jacket away from the transducer. Another approach has added a mechanical disc jacket lifter, which operates in conjunction with the main loading lever to lift the semi-flexible disc jacket slightly above the lower transducer. A drawback of this approach is that the upper transducer and the polyurethane pressure pad must be lifted even further than otherwise necessary to clear the top surface of the disc jacket.

The magnetic transducers in these floppy disc drives move radially along the data disc surface to address individually the concentric data tracks. It is essential in the use of these drives, that the loading or unloading of a data disc can be commenced at any time, without first positioning the movable magnetic transducer carriage to a preferred position, therefore the loading and unloading operation must be capable of successful completion with the carriage carrying the magnetic transducers in any position along its travel. In one of the prior art designs, the upper transducer is lifted by the action of an arm projecting from the transducer support engaging a flat surface On a lever. This arm must be positioned sufficiently close to the flexure of the upper transducer arm, to provide sufficient lift and clearance when the carriage is positioned at track zero, the carriage position closest to the rear of the machine. In those cases where the carriage is positioned at the inner track when loading or unloading occurs, the added lift of the lever at this position, causes an added lift to the upper transducer arm far in excess of that necessary for adequate clearance, and causes excessive bending in the flexure hinge of the upper transducer arm.

It would be possible to ship newly manufactured drives of the double-sided type with a data disc inserted, or with a substitute disc of plastic or paper, however vibration during shipping would abrade the fine finish on the transducer surfaces, and so this approach is not used. Instead, these drives are shipped with the loading lever and handle in the unloaded position. As a result, the handle on many designs projects from the front of the drive, and to provide for this, it is the common practice to fabricate a shipping container substantially larger than the drive, and equipped with a pocket into which the handle can project, the shipping container being strong enough to protect the projecting handle from destructive accidents.

SUMMARY OF THE INVENTION

It is an object of the present invention to accurately position a side edge of the data disc jacket against a permanent reference surface.

It is a further object, to prevent loading of the machine elements against the disc, if the data disc is only partially inserted.

It is a further object, to prevent loading of the machine elements, if no data disc has been inserted.

It is a further object, to permit safe shipping of the drive with the handle in the closed position, and the machine elements in the unloaded position.

It is a further object, to provide substantial shock resistance to the system when the handle is closed and no data disc is loaded.

It is a further object, to isolate the mechanism and the data disc from any possibility of damage from excessive forces applied to the handle during any mode of operation.

It is a further object, to provide for successful loading or unloading of data discs when no current is being supplied to the drive.

It is a further object, to provide retraction to the lower transducer as well as the upper transducer.

It is a further object, to provide equal retraction to the upper and lower transducers regardless of the position of the transducer carriage.

It is a further object, to minimize friction in the standing wave eliminator.

It is a further object, to provide a continuous electrical indication of readiness, independent of spindle rotation.

The invention includes a disc drive defining a slot for receiving a floppy disc and its protective cover positioned to be engaged by appropriate driving means and transducers for reading/writing data thereon. A lifting mechanism rotatable about an axis which is substantially parallel to the direction in which the disc is inserted, separates the disc drive and the magnetic transducers and retains them in the separated positions unless and until a floppy disc and its cover have been inserted and properly positioned within the drive. In accordance with a specific aspect of the present invention, interlock means is provided to restrain the lifting mechanism in its position for maintaining the drive means and the transducers separated even though the normal closure steps are followed, in the absence of a floppy disc properly positioned within the drive means.

DESCRIPTION OF THE INVENTION

Figure 5:
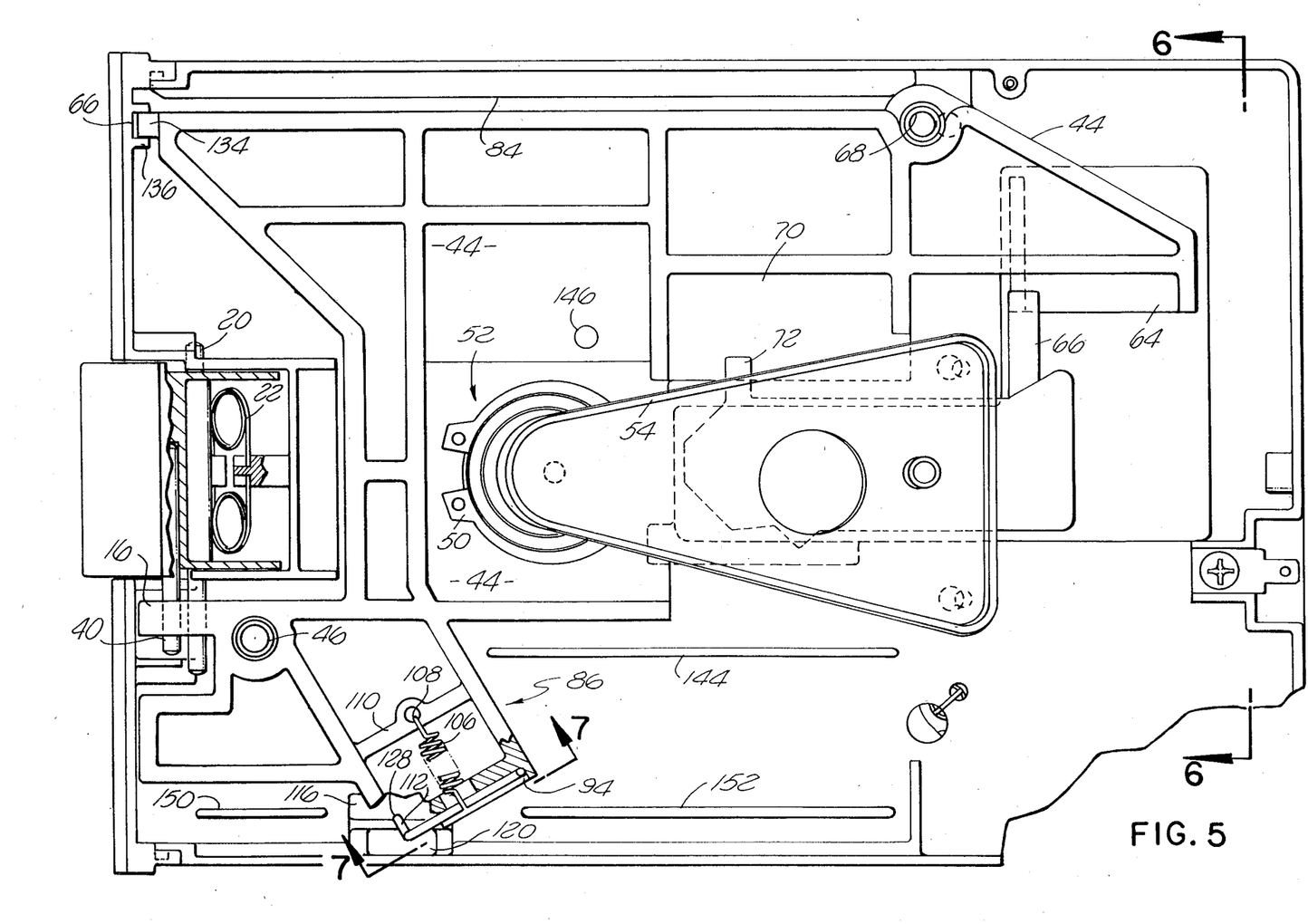
FIG. 5 is a top plan view with a cover of the drive removed illustrating the lifting mechanism.

As is illustrated in the drawings, there is shown generally a floppy disc drive 10 defining a slot 12 for receiving a floppy disc with its protective cover. A handle mechanism 14 operates a lifting mechanism generally illustrated in FIG. 5 through a contact arm 16 which engages a part of the handle 14 to clear the path to permit insertion of the floppy disc and its protective cover. The lifting mechanism functions to separate the spindle and rotor of the disc drive and also functions to separate the opposed magnetic transducers which accomplish the reading and writing upon the magnetic disc. Once the disc is in place, the handle mechanism 14 is closed permitting the lifting mechanism to allow loading of the disc both for rotation and for reading and writing of the magnetic data thereon.

In the present invention, and unlike prior art, the usual loose fitting slot within which the disc and its jacket rest after insertion is replaced with a reference surface against which one edge of the disc jacket is positioned. This more specific disc jacket positioning method yields a smaller range of possible data disc locations from which the spindle engaging apparatus must retrieve the data disc.

Unlike prior art, if the handle is operated to load a data disc, but that disc is not fully inserted, a broad flat surface of a retaining claw strikes the jacket but applies only the force exerted by a built-in compression spring. The handle itself disengages from the retaining claw, and is free to travel to its normally closed position without conveying the force of the operator's hand to the retaining claw.

Similarly, and again unlike prior art, if the handle is operated as if to load a disc, but no disc has been inserted, the handle will also disengage from the internal mechanism, and proceed to its fully closed position without exerting damaging forces to the mechanism.

Because of this capability, the loading handle can be freely operated at any time, and left in either position whether or not a disc is in the drive. No warnings against closing the drive without a disc need be made, and no damage to the drive or to the magnetic transducers is possible from inserting discs or operating the loading handle.

An additional advantage of the above feature, is that the handle can be moved to the most compact and least vulnerable closed position for shipping purposes, while the drive itself remains in the unloaded position with double heads safely separated.

Unlike prior art which moves only the upper transducer away from the data disc, and sometimes moves the data disc itself a small amount away from the lower transducer, the present invention moves both the upper and lower transducers away from the data disc during loading and unloading operations.

Unlike prior art which provides excessive lift to the upper transducer when the transducer carriage is positioned toward the inner data tracks, the present invention provides equal lift to both the upper and lower transducers for all carriage positions.

In prior art, a rectangular pad of elastic foam polyurethane has been used to provide a continuous pressure over the entire area of contact of the urethane pad. In the current invention, standing wave suppression is accomplished instead by a series of spring fingers, each exerting force along a short line of contact, and in the aggregate contributing a discontinuous line of force rather than an area of force. By this method standing wave suppression can be achieved with a more closely controlled force which is smaller in magnitude, and therefore contributes less to data disc heating, flutter, and spindle motor loading.

In prior art drives, as in the present invention a mechanical or photoelectric switch is positioned to detect a notch in the edge of the disc envelope. If this notch has been covered with a tape tab, the switch is activated, and the electronic logic is signalled that a disc is loaded into the machine, and that that disc is not to be written on. This notch is called a write protect notch. If on the other hand, the notch has not been blocked off, then the write protect switch is not activated, and the electronics receives no indication from this source that a disc has been loaded. Although this switch is necessarily momentarily activated during the insertion of the disc in most designs, this momentary signal cannot be reliably used as an indication that a disc has been loaded, since the system can be shut down, and then reactivated and if a disc has been loaded or unloaded during the period in which the power was turned off, the electronic logic is uninformed.

Some drives incorporate a switch to signal that the loading apparatus has been positioned into the loaded position, however in prior art this sensor cannot be relied upon to determine whether a disc is actually in place.

In prior art as well as in the present invention, a photoelectric sensor and a suitable illuminating device are positioned on opposite sides of the data disc and near the central spindle hole. When the data disc rotates one or more index holes punched through the opaque data disc allow flashes of light to pass from the illuminator to this index photoelectric sensor. These signals provide the electronic logic with angular positioning data which allows the orderly writing and retrieval of data on the disc, and on early drives with spindles which rotated all of the time, the existence of index signals was a reliable indication that the drive contains a data disc. In more recent drives, in order to provide a longer service life, and to reduce current consumption and heating within the drive, and to permit the heads to be loaded against the disc continuously without excessive wear, spindle motors are now turned on and off. Consequently existing drives cannot determine that a data disc is loaded if the spindle is not rotating, and if the write protect notch has not been taped over.

In the current invention, a photoelectric sensor is activated when the loading elements move to the operating position, and since this cannot happen unless a data disc has been loaded, this sensor provides a continuous and conclusive indication of readiness.

Figure 1:
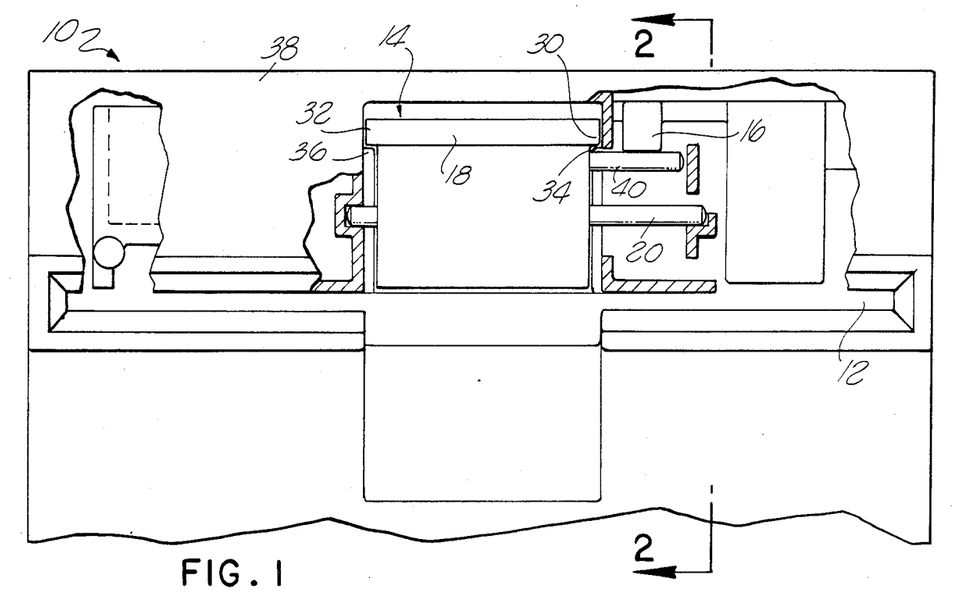
FIG. 1 is a front view partially broken away and partially in section showing the receiving slot and operating handle of a disc drive means constructed in accordance with the present invention.
Figure 2:
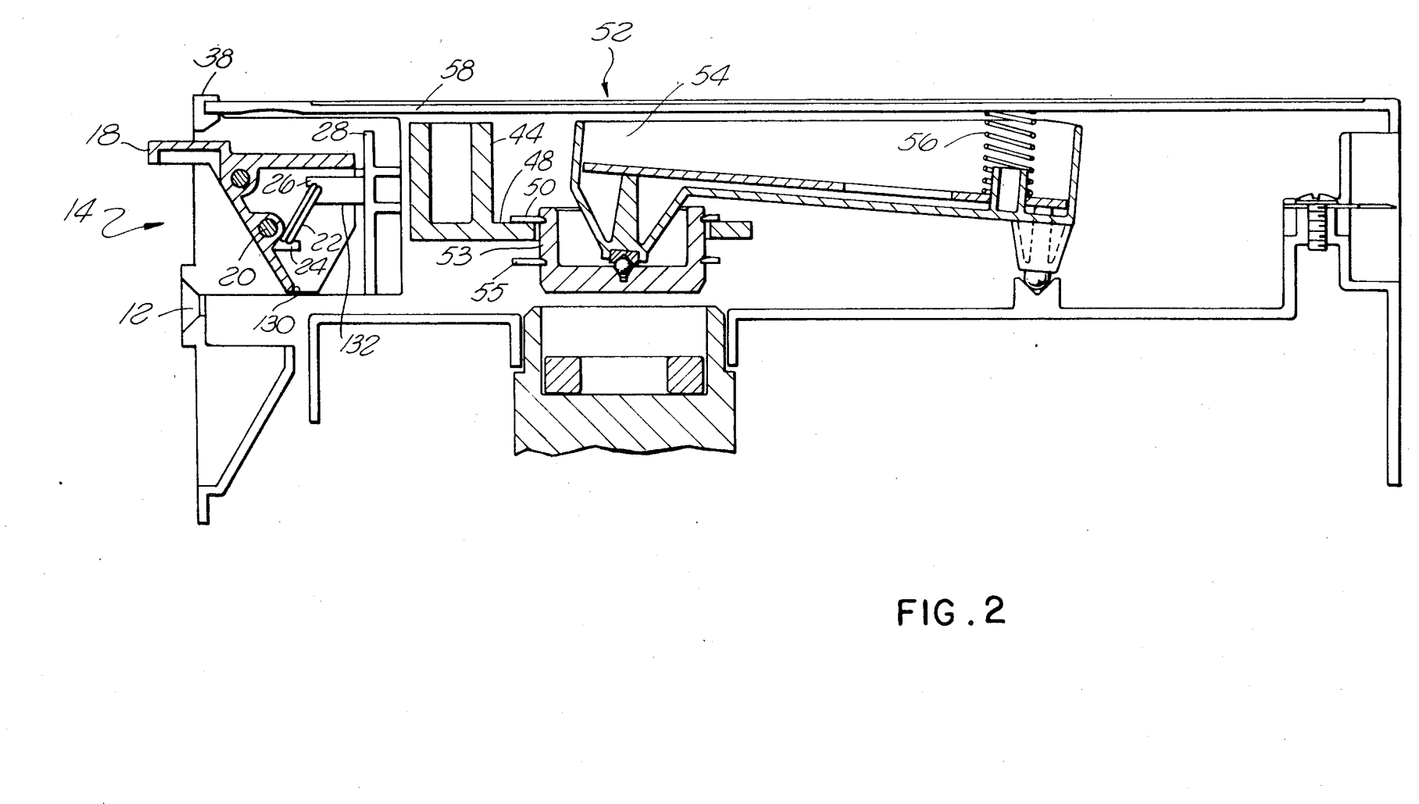
FIG. 2 is a cross-sectional view taken about the lines 2—2.
Figure 3:
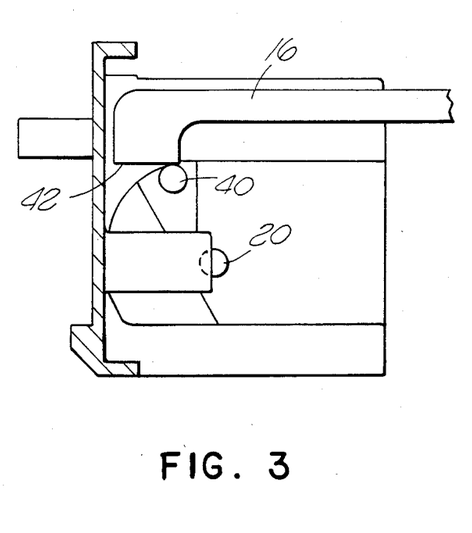
FIG. 3 is a fragmented cross-sectional view of a portion of the handle apparatus illustrating its cooperation with the lifting mechanism.

The handle assembly 14 is fabricated from glass filled polycarbonate and is injection molded. The assembly 14 includes a handle 18 which is pivotably mounted on a pin 20. A double torsion spring 22 (FIGS. 2 and 5) is affixed between protrusions 24 and 26 on the handle assembly 14 and the housing 28 respectively. The spring 22 functions to assure complete travel of the handle assembly between its two limit positions. As shown in FIGS. 1 and 2, the spring 22 has rotated handle 18 clockwise until ears 30 and 32 rest on flanges 34 and 36 respectively, which are formed integrally with the face 38, which is also a glass filled polycarbonate injection molded member. Handle 18 as shown in FIG. 2 in elevation is in the completely open position, and crank pin 40 is located at its highest point of travel. Surface 42 (FIG. 3) on extension 16, a portion of glass filled polycarbonate injection molded lifter 44, abuts crank pin 40 and since helical compression spring 46, in FIG. 5, exerts less force than double torsion spring 22, the lifter 44 is held in a raised position. As can be seen, the compression spring 46 works against the cover 58 to apply force to the lifter 44 to continuously urge it downwardly as viewed in FIG. 2.

Figure 6:
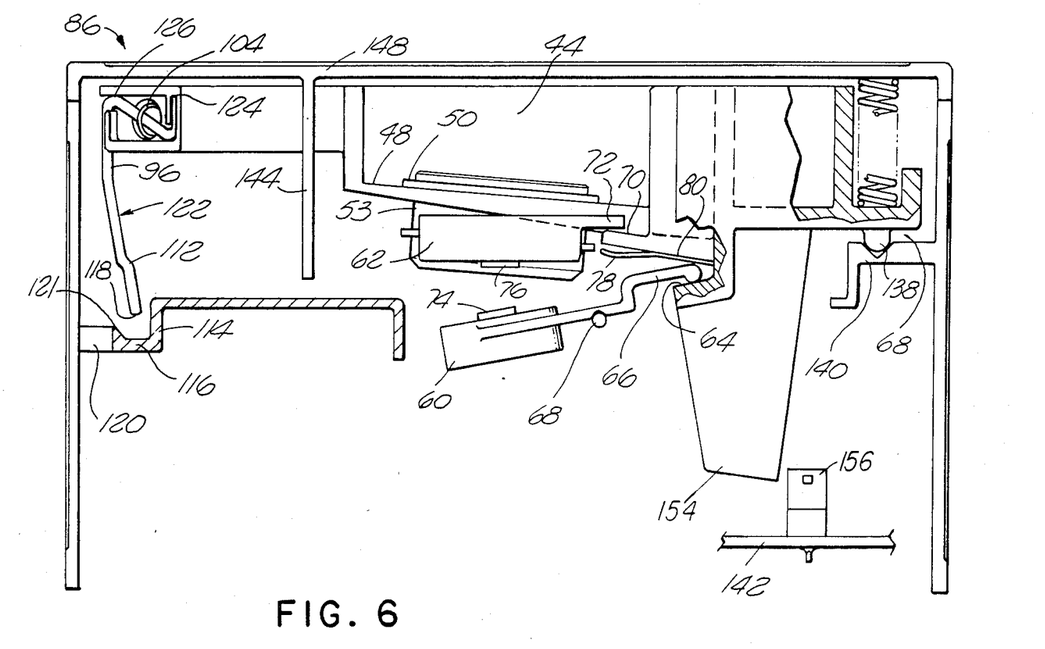
FIG. 6 is a view taken about the line 6—6 of FIG. 5.

The lifter plate 44 is provided to displace the driving mechanism which normally engages a floppy disc to rotate it and also simultaneously to space the magnetic transducers apart for purposes of loading and unloading the floppy disc into the drive mechanism. FIGS. 2 and 6 illustrate the lifter 44 holding the spindle assembly 52 and the magnetic transducer assemblies 60 and 62 in their spaced-apart positions. As above indicated; when the handle 18 is rotated to its full open position, the crank pin 40 raises the lifter mechanism 44 to the position shown in FIGS. 2 and 6 by rotating the lifter about pivot points 66 and 68.

When the lifter mechanism 44 is raised, as above-described, a surface 48 thereof engages the retaining ring 50 which is held in place on the spindle assembly 52 and thus moves the spindle assembly 52 along with the compensator arm 54 to the position as illustrated in FIG. 2. In moving from the closed position to the open position as illustrated in FIG. 2, a compression spring 56 which normally urges the spindle assembly toward its closed position is compressed. As the lifter 44 rotates in a clockwise direction as shown in FIG. 6, the surface 64 thereof engages the arm 66 on the lower transducer support 60 causing it to pivot about the support member 68, thus moving the lower transducer in a downward direction as viewed in FIG. 6 away from the plane which would be occupied by the floppy disc and its cover. At the same time, the surface 70 of the lifter 44 engages the arm 72 of the upper transducer support 62 and rotates it in a counter-clockwise direction about appropriate support points (not shown in FIG. 6) again moving the magnetic transducer out of the plane which would be occupied by the floppy disc and its protective jacket. As can be seen particularly in FIG. 6, the surfaces of the magnetic transducers 74 and 76 are spaced well apart and out of the plane which would be occupied by the floppy disc. In addition, it can also be seen that the spindle 53 of the spindle assembly 52 has also been thusly raised as is more clearly illustrated in FIG. 2.

The multi-fingered spring 78 which is mounted on surface 80 of the lifter 44 is also carried upwardly when the lifter 44 is rotated as above described. The spring 78 normally, during operation of the disc drive mechanism, contacts the disc assembly at a plurality of points to eliminate standing waves on the disc as it rotates from position to position during the read/write operation associated with the disc.

Figure 4:
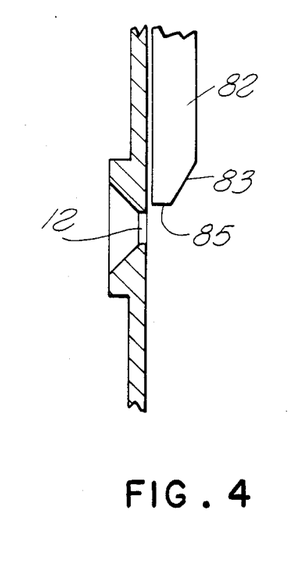
FIG. 4 is a fragmented cross-sectional view illustrating apparatus for assuring proper positioning of the floppy disc within the drive means.

As is more clearly illustrated in FIG. 4, when the handle is in the position as shown in FIG. 2, a bevelled projection 82 has been lifted upwardly to completely clear the opening 12 through which the floppy disc assembly is inserted.

As will now be clearly understood by those skilled in the art, when the lifter mechanism 44 is in the position as shown in FIGS. 2 and 6, all of the mechanical elements which normally engage the floppy disc assembly during reading/writing thereon are completely cleared of the data disc slot permitting insertion of the disc assembly through the opening 12 and into the slot provided for it in the disc drive for normal operational sequences.

With the data disc fully inserted, the operator then depresses the handle 18, rotating the handle assembly 14 in a counter-clockwise direction (FIG. 2) through ninety degrees into the fully closed position. In this position surface 130 of handle assembly 14 abuts surface 132 of projection 26 thereby limiting travel of the handle assembly. Double torsion spring 22 having traveled over center holds the handle assembly 14 in this fully closed position. The crank pin 40 having traveled to its lowest position, allows surface 42 of lifter 44 to be driven downwardly along with the crank pin 40 by the force generated by the compression spring 46.

The lifter 44 rotates downward about an axis through points 66 and 68 defined through cylinder 134 acting in cylindrical bearing 136, and spherical projection 138 acting in conical socket 140. This axis of rotation is substantially parallel to the direction in which the disc assembly is inserted into the drive means. As the lifter 44 rotates, the surface 48 descends allowing compression spring 56 to depress compensator arm 54 and spindle assembly 52 until retaining ring 55 is fully engaged against the data disc. At this point surface 48 disengages from retaining ring 50 and continues to descend until stopping at its extreme lower position between rings 50 and 55. As can now be seen, the lifter 44 is completely free from contact with the spindle assembly 52.

At the same time, surface 70 rotates away from arm 72 of upper transducer support 62 allowing it to rotate toward its operative position and to descend until it is completely free from contact with the transducer support arm.

Simultaneously, surface 64 rotates away from arm 66 of lower transducer support 60 allowing it to rotate until it contacts the data disc surface which is positioned by contact on the opposite side by the upper transducer. Once this contact is made by the lower transducer, surface 64 of the lifter 44 continues to move away from arm 66 until it is completely free from contact with the lower transducer support.

At the same time, multi-fingered leaf spring 78 rotates downward until it makes contact with the upper surface of the data disc jacket. Further rotation of the lifter 44 causes an elastic deflection of the spring fingers, generating a small force in each finger which is exerted against the data disc jacket and which is opposed by a flat portion of the chassis below the data disc jacket. These small forces collapse the data disc jacket against the data disc and suppress the formation of standing waves in the data disc.

At the same time, projection 82 of the lifter 44, as illustrated in FIG. 4, moves downward. If the data disc jacket is not completely inserted, beveled surface 83 engages the edge of the data disc jacket and drives it deeper and into proper position in the slot. If instead the data disc jacket is so far from being fully inserted that the flat surface 85 of projection 82 engages the flat upper surface of the data disc jacket, then downward rotation of the lifter 44 is stopped, and although handle assembly 14 and crank pin 40 continue their downward movement to their full extreme, only the force exerted by compression spring 46 is applied to the data disc jacket. Because the lifter 44 cannot descend under these conditions, spindle assembly 52 is prevented from damaging the edge of the central hole in the data disc by engaging a misaligned hole. At the same time, the transducers are protected from potential damage from possible contact with an improperly aligned data disc jacket.

If insertion of a data disc has been completely omitted, and handle assembly 14 is operated downward, then wire form 96 will not have been deflected from its position as illustrated in FIG. 6, and consequently as the lifter begins to descend, distal end 118 thereof will contact surface 116 of chassis 114, stopping further downward rotation of the lifter 44. Again, although handle assembly 14 and crank pin 40 are free to continue their downward movement to their full extreme, the lifter will remain at this intermediate position. With the lifter at this position, the upper and lower transducers are unable to contact each other and thus they are prevented from sticking together or from abrading each other due to vibration during shipping. Ridge 121 prevents end 118 of wire form 96 from potential, shock induced, lateral movement during shipping, and thus prevents accidental descent of the lifter.

Shutter 154, a molded extension of lifter 44, interrupts the beam of photosensor assembly 156 mounted on printed circuit board 142 when lifter 44 is rotated to its fully loaded position. Since, due to the interlock of wire form 96, the lifter can only reach its fully loaded position if a data disc has been inserted, the interruption of this photosensor beam indicates to the electronic logic, that the driver is fully loaded and ready for data transfer operations.

When a data disc is unloaded, the handle assembly 14 is rotated upward. Multi-fingered spring 78 leaves the data disc jacket. Surfaces 64 and 70 swing transducers 60 and 62 away from the disc surface. Surface 48 engages the spindle assembly, and lifts the spindle away from the data disc. Due to the elastic constriction of the data disc around the spindle, the data disc is at first drawn upward with the spindle. Elongated rib 144 and index sensor assembly 146 comprising portions of the upper cover assembly 148, prevent substantial upward movement of the data disc, and the disc is therefore stripped from the rising spindle assembly. Elongated ribs 150 and 152, further extensions of zinc alloy die casting 148, are also positioned above the data disc to loosely constrain the lateral portions of the data disc jacket.

Provision is made in the present invention to assure the data disc is properly aligned and to further interlock the lifting structure 44 to preclude its moving into the loaded position unless in fact there is a floppy disc properly inserted in place within the unit. This structure is more specifically illustrated in FIGS. 5, 6 and 7 to which reference is hereby made.

Figure 7:
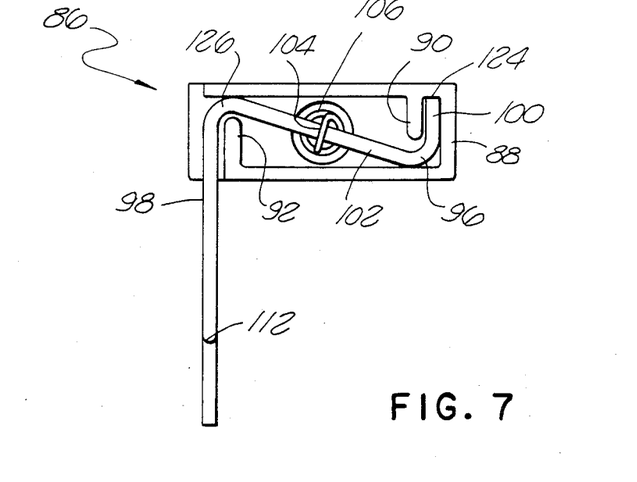
FIG. 7 is a view taken about the line 7—7 of FIG. 5.

A reference surface 84 is provided within the disc drive and against which the edge of the floppy disc jacket should reside for proper alignment with regard to remaining portions of the disc drive apparatus. To assure contact of the disc jacket with the reference surface 84, there is provided a spring loaded wire form assembly shown generally at 86 which engages one edge of the floppy disc jacket and through application of a force thereagainst urges the floppy disc jacket into engagement with the reference surface 84. As is illustrated, the assembly 86 includes an extension of the lifter mechanism 44 and is molded integrally therewith. The extension provides a flange 88 which is peripherally disposed about the extension and from which there extends keeper arms 90 and 92 thereby providing an appropriate recess 94 within which there is positioned a wire form 96. The wire form as shown in plan in FIG. 7 is a generally N-shaped member with the front leg 98 much longer than the rear leg 100. The interconnecting arm 102 between the legs 98 and 100 is engaged by one end 104 of a spring 106, the opposite end 108 of which is anchored to a cross member 110 of the molded extension of the lifting mechanism 44. The spring 106 thus applies a force to the wire form 96 retaining it in the position shown in FIGS. 5, 6 and 7. The front leg 98 is offset as illustrated at 112 to properly function in its role as a safety interlock and also to provide appropriate contact with the floppy disc jacket.

The chassis 114 of the disc drive is formed to provide a ledge 116 which extends immediately beneath the distal end 118 of the wire form 96. It can be seen particularly by viewing FIG. 6 that if the lifting apparatus 44 is pivoted downwardly about the pivot points 66 and 68 so as to move counter-clockwise as viewed in FIG. 6, the end 118 of the wire form 96 will contact the ledge 116 stopping further movement thereof, thereby precluding the faces of the magnetic transducers 74 and 76 from engaging each other. The chassis 114 also provides an opening 120 immediately adjacent the ledge 116. Thus if the wire form 96 is moved toward the left as viewed in FIG. 6, the end 118 thereof will pass into the opening 120, thereby permitting the lifting mechanism 44 to be lowered to its fully operable position and permitting the spindle apparatus and the magnetic transducers to move into their operating positions.

It should be noted that the wire form is held in place within the recess 94 only by the spring 106. Thus, in response to a force being applied against the leg 98 as illustrated by the arrow 122 in FIG. 6, the leg 98 can rotate generally toward the left as viewed in FIG. 6. Such rotation is accomplished by rotation of the wire form 96 about the points 124 and 126 and against the force of the spring 106. In operation, when the operator inserts the floppy disc with its protective jacket into the opening 12 so that it enters the slot provided in the disc drive, it will be moving from left to right as viewed in FIG. 5 or when viewed in FIG. 6 from behind the plane of the illustration and toward the viewer. As the disc jacket thusly moves, it will engage the lower portion of the leg 98 and as a result of the angular disposition of the wire form (as particularly seen in FIGS. 5 and 6) a resultant force will be applied by the leading edge of the disc jacket to the point 128 (FIG. 5) of the wire form 96. This contact moves the wire form so that the end 118 thereof is over the opening 120 at this position. The edge of the disc jacket then slides along the inner edge of the wire form leg 98. The force generated by the spring 106 and transmitted through the leg 98 then pushes the disc jacket against the reference surface 84 to properly position it laterally with respect to the spindle apparatus and the transducers.

What is claimed is:

1. Apparatus for loading and unloading a magnetic memory disc into and out of a drive mechanism having drive means therein for engaging and rotating said disc and magnetic transducers therein, said apparatus comprising:
    (A) housing means having a front and rear, said front defining an opening therethrough said disc being inserted through said opening on the front of said housing means and traveling towards the rear of said housing means;
    (B) lifter means pivotally supported in said housing for rotation between first and second positions, on an axis of rotation, said axis of rotation being substantially parallel with the direction of insertion of said disc within said housing, said lifter means attached to said drive means and said transducers such that when in said first position said lifter means moves said drive means and said transducers out of operative relationship with said disc and when in said second position permitting movement of said drive means and said transducers into operative relationship with said disc;
    (C) separate actuating means engaging said lifter means for rotation thereof between said first and second positions; and
    (D) interlock means engaging said lifter means and said housing means to preclude movement of said lifter means from said first position to said second position in the absence of a disc being inserted into said housing which thereby prevents said drive means from moving to a disc engaging position and said transducers from moving to a transducing position.

2. Apparatus as defined in claim 1 wherein said lifter means is a plate member and said axis of rotation is defined by first and second pivot points, one of said pivot points including a substantially spherical surface resting in a conical depression.

3. Apparatus as defined in claim 2 which further includes spring means disposed between said plate and said housing means for biasing said lifter means toward said second position.

4. Apparatus as defined in claim 1 wherein said lifter means defines a first surface thereon and which further includes standing wave suppression means affixed to said first surface for engaging said disc means when said lifter means is in its second position.

5. Apparatus as defined in claim 4 wherein said standing wave suppression means includes a plurality of resilient members each of which contacts said disc means at a discrete point.

6. Apparatus as defined in claim 5 wherein said standing wave suppression means includes a multifingered leaf spring.

7. Apparatus as defined in claim 6 wherein said fingers of said leaf spring each contact said disc means.

8. Apparatus as defined in claim 7 wherein each of said fingers contacts said disc means in a line of contact across the surface thereof.

9. Apparatus as defined in claim 1 which further includes means for sensing a fully loaded disc means and providing an electrical signal responsive thereto.

10. Apparatus as defined in claim 1 wherein said sensing means includes a photoelectric sensor and said lifter means includes an opaque shutter movable relative to said photoelectric sensor as said lifter means moves to its second position.

11. Apparatus as defined in claim 1 wherein said interlock means includes a leg pivoted at one end thereof to one of said lifter means and said housing means and spring means biasing said leg to a first position where the distal end thereof engages the other of said lifter means and said housing means as said lifter means is moved from its first position toward its second position.

12. Apparatus as defined in claim 11 which further includes an opening defined by one of said housing and said lifter means disposed adjacent to but offset from the distal end of said leg means when said leg means is in its first position and disposed such that when said leg means is moved from its first position to a second position, it will pass through said opening thereby permitting said lifter means to move from its first position to its second position.

13. Apparatus as defined in claim 12 wherein said leg is carried by said lifter means and is pivoted thereon.

14. Apparatus as defined in claim 13 wherein said leg adjacent its distal end but displaced therefrom is disposed within the space to be occupied by said disc means and said leg is engaged by said disc means upon its being inserted into said housing through said opening and upon engagement by said disc means is moved from its first position.

15. Apparatus as defined in claim 11 wherein said leg adjacent its distal end but displaced therefrom is disposed within the space to be occupied by said disc means and said leg is engaged by said disc means upon its being inserted into said housing through said opening and upon engagement by said disc means is moved from its first position.

16. Apparatus as defined in claim 1 wherein said lifter means includes a first surface engaging a first part of said drive means for carrying said part of said drive means out of engagement with said disc when said lifter means is in said first position.

17. Apparatus as defined in claim 16 wherein said first part of said drive means is a spindle assembly.

18. Apparatus as defined in claim 1 wherein said lifter means further includes a third surface thereon for engaging said transducers and moving said transducers from operative relationship with said disc when said lifter means is in its first position.

19. Apparatus as defined in claim 18 wherein said magnetic transducer means includes first and second substantially opposed magnetic transducers positioned to engage opposite sides of said disc and wherein said third surface means engages the supports for said transducers to move said transducers in opposite directions away from said disc when said lifter means is in its first position.

20. Apparatus as defined in claim 1 wherein said actuating means includes a handle assembly pivotally secured to said housing means and engaging said lifter means.

21. Apparatus as defined in claim 20 wherein said lifter means includes a plate member having a projection extending therefrom into engagement with said handle assembly.

22. Apparatus as defined in claim 21 wherein said handle assembly further includes a crank pin displaced from the axis of pivotal rotation of said handle assembly and engaging said projection on said plate member, said crank pin rotating through a predetermined arc to allow movement of said lifter means between said first and second positions.

23. Apparatus as defined in 22 which further includes overcenter spring means said handle assembly to ensure movement of said crank pin through its complete arc once it has passed the center position thereof.

24. Apparatus as defined in claim 23 wherein said handle assembly is rotatable through its entire arc irrespective of the position of said interlock means.

25. Apparatus as defined in claim 1 wherein said lifter means includes a projection which moves across said opening in said housing means as said lifter means moves from its first position to its second position.

26. Apparatus as defined in claim 25 wherein said projection includes a first angularly disposed surface for engaging the edge surfaces of an incompletely inserted disc means for urging said disc means into its fully inserted position.

27. Apparatus as defined in claim 26 wherein said projection includes a second surface disposed substantially parallel with said disc means for engaging said disc means when said disc means is incompletely inserted to a degree such that said angular surface is incapable of contacting the edge of said disc means.

28. Apparatus as defined in claim 1 wherein said interlock means is disposed in the space to be occupied by said disc means so that upon insertion of said disc into said housing through said opening, said interlock means is engaged by said disc means and said interlock means is moved from its interlock position to a position such that said lifter means can move from its first position to its second position.

* * * * *